(12) United States Patent
Hu et al.

(10) Patent No.: US 11,508,048 B2
(45) Date of Patent: Nov. 22, 2022

(54) METHOD AND SYSTEM FOR GENERATING COMPOSITE PET-CT IMAGE BASED ON NON-ATTENUATION-CORRECTED PET IMAGE

(71) Applicant: SHENZHEN INSTITUTES OF ADVANCED TECHNOLOGY, Guangdong (CN)

(72) Inventors: Zhan Li Hu, Guangdong (CN); Dong Liang, Guangdong (CN); Yong Chang Li, Guangdong (CN); Hai Rong Zheng, Guangdong (CN); Yong Feng Yang, Guangdong (CN); Xin Liu, Guangdong (CN)

(73) Assignee: SHENZHEN INSTITUTES OF ADVANCED TECHNOLOGY, Guangdong (CN)

( * ) Notice: Subject to any disclaimer, the term of this patent is extended or adjusted under 35 U.S.C. 154(b) by 230 days.

(21) Appl. No.: 16/976,474

(22) PCT Filed: Feb. 10, 2020

(86) PCT No.: PCT/CN2020/074625
§ 371 (c)(1),
(2) Date: Aug. 28, 2020

(87) PCT Pub. No.: WO2021/159236
PCT Pub. Date: Aug. 19, 2021

(65) Prior Publication Data
US 2021/0248728 A1    Aug. 12, 2021

(51) Int. Cl.
*G06T 5/50* (2006.01)
*G06T 5/00* (2006.01)

(52) U.S. Cl.
CPC ............... *G06T 5/50* (2013.01); *G06T 5/001* (2013.01); *G06T 2207/10081* (2013.01);
(Continued)

(58) Field of Classification Search
None
See application file for complete search history.

(56) References Cited

U.S. PATENT DOCUMENTS

| 2012/0265050 A1 | 10/2012 | Wang |
| 2016/0116603 A1* | 4/2016 | Chen ............... G01T 1/1603 |
| | | 250/362 |

(Continued)

FOREIGN PATENT DOCUMENTS

| CN | 109410135 | 3/2019 |
| CN | 109697741 | 4/2019 |
| CN | 109961491 | 7/2019 |

OTHER PUBLICATIONS

"International Search Report (Form PCT/ISA/210) of PCT/CN2020/074625," dated Apr. 9, 2020, pp. 1-4.

*Primary Examiner* — Jiangeng Sun
(74) *Attorney, Agent, or Firm* — JCIP Global Inc.

(57) ABSTRACT

The present disclosure discloses a method and a system for generating a composite PET-CT image based on a non-attenuation-corrected PET image. The method includes: constructing a first generative adversarial network and a second generative adversarial network; obtaining a mapping relationship between a non-attenuation-corrected PET image and an attenuation-corrected PET image by training the first generative adversarial network; obtaining a mapping relationship between the attenuation-corrected PET image and a CT image by training the second generative adversarial network; and generating the composite PET-CT image by utilizing the obtained mapping relationships. According to the present disclosure, a high-quality PET-CT image can be directly composited from a non-attenuation-corrected PET image, and medical costs can be reduced for patients, and radiation doses applied to the patients in examination processes can be minimized.

9 Claims, 2 Drawing Sheets

(52) U.S. Cl.
CPC ............... *G06T 2207/10104* (2013.01); *G06T 2207/20081* (2013.01); *G06T 2207/20084* (2013.01)

(56) References Cited

U.S. PATENT DOCUMENTS

| | | | |
|---|---|---|---|
| 2020/0043163 A1* | 2/2020 | Jin | G06T 7/0012 |
| 2020/0211236 A1* | 7/2020 | Zhang | G06N 3/084 |
| 2020/0258272 A1* | 8/2020 | Ding | G06T 11/008 |
| 2021/0090212 A1* | 3/2021 | Piat | G06N 3/088 |
| 2021/0150799 A1* | 5/2021 | Yang | G06T 9/002 |
| 2021/0398329 A1* | 12/2021 | Goedicke | G06T 11/005 |
| 2022/0091286 A1* | 3/2022 | Panin | A61B 6/037 |

* cited by examiner

METHOD AND SYSTEM FOR GENERATING COMPOSITE PET-CT IMAGE BASED ON NON-ATTENUATION-CORRECTED PET IMAGE

CROSS-REFERENCE TO RELATED APPLICATION

This application is a 371 application of International PCT application serial no. PCT/CN2020/074625, filed on Feb. 10, 2020. The entirety of each of the above-mentioned patent applications is hereby incorporated by reference herein and made a part of this specification.

BACKGROUND

Technical Field

The present disclosure relates to the field of medical image processing technologies, and more particularly, to a method and a system for generating a composite positron emission tomography-computed tomography (PET-CT) image based on a non-attenuation-corrected PET image.

Description of Related Art

Positron emission tomography (PET) is a non-invasive imaging technology. After a specific contrast agent such as $^{18}$F-fluorodeoxyglucose (FDG) is injected, data are acquired with the aid of a PET scanner and undergo a series of post-processing. A reconstructed PET image can clearly reflect metabolic levels of patients' tissues or organs, and thus can be used clinically for early screening of tumors and post-operative staging diagnosis of the patients. However, the PET imaging only reflects the functional information of tissues or organs. It also requires additional computer tomography (CT) to perform attenuation correction of the PET imaging to provide additional human anatomical information to locate lesion positions, which inevitably brings the patients additional ionizing radiation, and thus potentially increases cancer risks of the patients. Therefore, research and development of an effective method capable of generating pseudo-CT from medical images of other modalities, such as Magnetic Resonance Images (MRI), so as to replace additional anatomical imaging during PET scanning, have important scientific significance and application prospect for reducing the radiation doses suffered by the patients and reducing high costs of PET/CT examination.

In the existing technologies, technical solutions for generating CT images mainly have the following problems. Directly performing a PET/CT examination is not only more expensive, but also brings more radiation doses for the patients during the examination process. The method for estimating attenuation correction of PET by compositing CT using MRI has the disadvantage of longer time required for acquiring MRI sequences. Furthermore, the accuracy of manual data registration has a direct impact on post-imaging quality. Moreover, involuntary movement of the patients' limbs during PET/MRI examination may cause truncation artifacts, etc.

SUMMARY

An objective of the present disclosure is to provide a method and a system for generating a composite PET-CT image based on a non-attenuation-corrected PET image, which is a new technical solution for implementation of compositing a PET-CT image from a non-attenuation-corrected PET image based on a deep learning method.

According to a first aspect of the present disclosure, there is provided a method for generating a composite PET-CT image based on a non-attenuation-corrected PET image, which includes following steps:

constructing a first generative adversarial network containing a first generator and a first discriminator, and constructing a second generative adversarial network containing a second generator and a second discriminator;

performing a feature extraction by using the non-attenuation-corrected PET image as an input of the first generator to obtain a composite attenuation-corrected PET image, and carrying out a training by using the composite attenuation-corrected PET image as an input of the first discriminator and by using the attenuation-corrected PET image as a reference image of the first discriminator to obtain a mapping relationship $G_1$ between the non-attenuation-corrected PET image and the attenuation-corrected PET image;

performing a feature extraction by using the attenuation-corrected PET image as an input of the second generator to obtain a composite CT image, and carrying out a training by using the as a reference image of the second discriminator to obtain a mapping relationship $G_2$ between the attenuation-corrected PET image and the CT image; and generating the composite PET/CT image from the non-attenuation-corrected PET image by utilizing the mapping relationship $G_1$ and the mapping relationship $G_2$.

In an embodiment, the first generative adversarial network and the second generative adversarial network have the same or different network structures.

In an embodiment, the first generator and the second generator have the same network structure, successively including a plurality of convolutional layers and pooling layers, a plurality of residual blocks, and a plurality of deconvolutional layers corresponding to the plurality of convolutional layers. The convolutional layer and the corresponding deconvolutional layer employ a hop connection.

In an embodiment, the first discriminator and the second discriminator employ a fully-connected neural network to determine whether an input image comes from an output of a corresponding generator or from the reference image.

In an embodiment, the first discriminator and the second discriminator compare, based on a distance, a distribution similarity between an output image from the corresponding generator and the reference image.

In an embodiment, the first generative adversarial network and the second generative adversarial network are based on Wasserstein Generative Adversarial Network, and an adversarial loss is defined as:

$$\min_G \max_D L_{WGAN}(G, D) = -E_x[D(x)] + E_z[D(G(x))] + \lambda E_{\hat{x}}\left[\left(\|\nabla_{\hat{x}} D(\hat{x})\| ^2 - 1\right)^2\right]$$

wherein $\lambda$ represents a hyperparameter, X represents an input image, G(x) represents an output of the generator, E(·) used for calculating an EM distance, $\hat{X}$ represents a sample randomly selected from a real image and the reference image, and D(·) represents a discrimination process of the discriminator.

In an embodiment, in a training process, a total objective function is set as including one or more of an adversarial loss term and a mean square error loss term, an image gradient loss teini, a multiscale content loss term, and a structural similarity loss term.

In an embodiment, in the training process, the total objective function is set as:

$$L(I_{AC}, I_{sAC}) = \lambda_o \cdot \min_G \max_D L_{WGAN}(G, D) + \lambda_{mse} \cdot L_{mse}(I_{AC}, I_{sAC}) +$$
$$\lambda_{gdl} \cdot L_{gdl}(I_{AC}, I_{sAC}) + \lambda_{content} \cdot L_{content}(I_{AC}, I_{sAC}) +$$
$$\lambda_{ssim} \cdot L_{ssim}(I_{AC}, I_{sAC})$$

wherein $I_{AC}$ represents a real attenuation-corrected PET image, $I_{sAC}$ represents a generated attenuation-corrected PET image, $\lambda_o$ represents a weight of the adversarial loss, $\lambda_{mse}$ represents a weight of the mean square error, $\lambda_{gdl}$ represents a weight of the image gradient loss, $\lambda_{content}$ represents a weight of the multiscale content loss, and $\lambda_{ssim}$ represents a weight of the structural similarity loss.

According to a second aspect of the present disclosure, there is provided a system for generating a composite PET-CT image based on a non-attenuation-corrected PET image. The system includes:

a network model constructing unit, configured to construct a first generative adversarial network containing a first generator and a first discriminator, and construct a second generative adversarial network containing a second generator and a second discriminator;

a first training unit, configured to perform a feature extraction by using the non-attenuation-corrected PET image as an input of the first generator to obtain a composite attenuation-corrected PET image, and carry out a training by using the composite attenuation-corrected PET image as an input of the first discriminator and by using the attenuation-corrected PET image as a reference image of the first discriminator to obtain a mapping relationship $G_1$ between the non-attenuation-corrected PET image and the attenuation-corrected PET image;

a second training unit, configured to perform a feature extraction by using the attenuation-corrected PET image as an input of the second generator to obtain a composite CT image, and carry out a training by using the composite CT image as an input of the second discriminator and by using the trained CT image as a reference image of the second discriminator to obtain a mapping relationship $G_2$ between the attenuation-corrected PET image and the CT image; and an image compositing unit, configured to generate the composite PET/CT image from the non-attenuation-corrected PET image by utilizing the mapping relationship $G_1$ and the mapping relationship $G^2$.

Compared with the existing technologies, the present disclosure has the following advantages. Directly generating a composite PET-CT image by using an existing non-attenuation-corrected PET image eliminates the step of performing an attenuation correction of PET imaging by compositing a CT image using MRI, which provides a new idea for subsequent practical applications. In the event that neither PET/MRI nor PET/CT have been popularized, the present disclosure provides an effective shortcut to compositing the PET/CT image, which not only can reduce medical expenses for the patients, but also can minimize the radiation doses applied to the patients in the examination processes.

BRIEF DESCRIPTION OF THE DRAWINGS

The accompanying drawings herein are incorporated in and constitute a part of this specification, illustrate embodiments of the present disclosure and, together with the specification, serve to explain the principles of the present disclosure.

DESCRIPTION OF THE EMBODIMENTS

Figure 1:
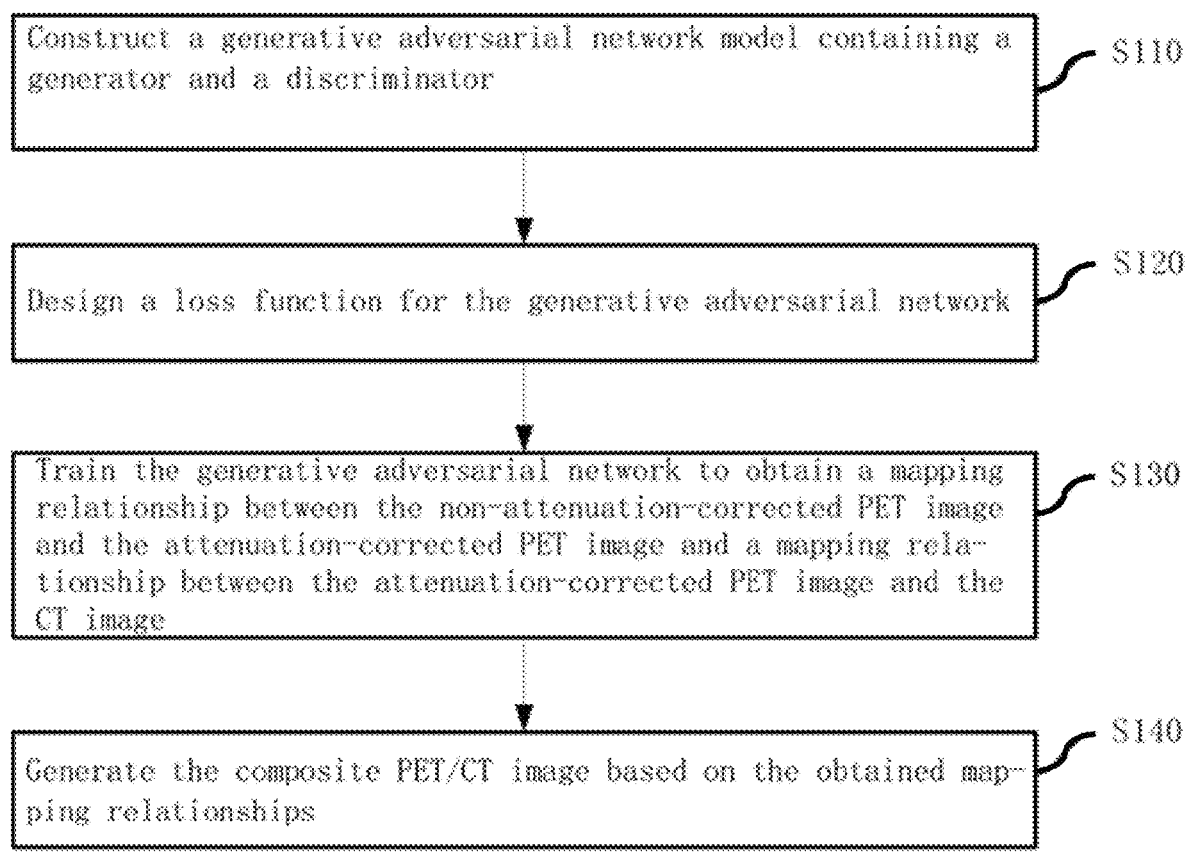
FIG. 1 is a flowchart of a method for generating a composite PET-CT image based on a non-attenuation-corrected PET image according to an embodiment of the present disclosure.

Various exemplary embodiments of the present disclosure will now be described in detail with reference to the accompanying drawings. It is to be noted that the relative arrangement, numerical expressions, and numerical values of the components and steps set forth in these embodiments do not limit the scope of the present disclosure unless otherwise specifically stated.

The following description of at least one exemplary embodiment is actually merely illustrative, and in no way serves as any limitation on the present disclosure and application or use thereof.

Technologies, methods and equipment known to those of ordinary skill in the related art may not be discussed in detail, but where appropriate, the technologies, methods and equipment should be considered as part of the specification.

In all examples shown and discussed herein, any specific values should be interpreted as merely exemplary and not limiting. Therefore, other examples of the exemplary embodiment may have different values.

It is to be noted that similar reference numerals and letters indicate similar items in the following accompanying drawings. Therefore, once an item is defined in one drawing, there is no need to discuss this item further in subsequent drawings.

In short, the present disclosure designs a two-stage network to solve the problem of attenuation correction of a PET image and reduction of radiation doses applied to patients during examination. The network includes two stages as below. In the first stage, self-attenuation-correction of a non-attenuation-corrected PET image is completed, and a composite attenuation-corrected PET image is obtained. In the second stage, a corresponding CT image is estimated by using the composite attenuation-corrected PET image obtained in the first stage. After these two stages, a PET/CT image may be generated by using a set of non-attenuation-corrected PET images.

To achieve the above object, in one embodiment, a composite PET/CT image is generated from a non-attenuation-corrected PET image by using an improved Wasserstein Generative Adversarial Network. Referring to FIG. 1, the method of the present disclosure specifically includes the following steps.

In Step S110, a generative adversarial network model containing a generator and a discriminator is constructed.

The network model provided by this embodiment of the present disclosure includes two generative adversarial networks, and each generative adversarial network includes a generator network (or generator for short) and a discriminator network (or discriminator for short). Implementation of generation of the composite, PET/CT image is divided into two stages as below. The first stage is a training stage, a training network is composed of the generator and the discriminator. The second stage is a testing stage, where the composite PET/CT image is generated from the non-attenuation-corrected PET image by using the network trained in the first stage.

Figure 2:
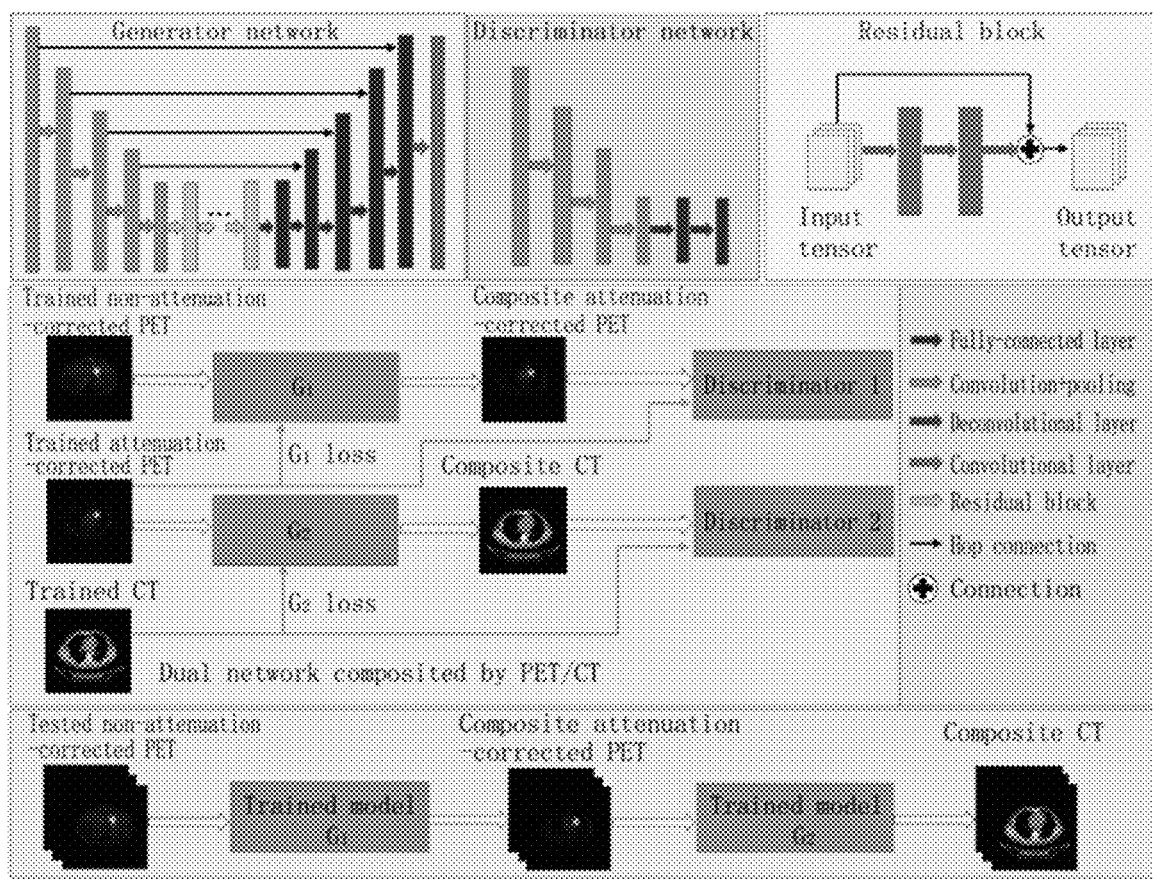
FIG. 2 is a diagram showing a network model for implementing the method for generating a composite PET-CT image based on a non-attenuation-corrected PET image according to an embodiment of the present disclosure.

Specifically, as shown in FIG. 2, in one embodiment, the generator network includes five convolutional layers (including a pooling layer, which employs, for example, max-pooling), nine residual blocks, five deconvolutional layers and one convolutional layer from left to right, and the discriminator network includes four convolutional layers (including a pooling layer) and two fully-connected layers in sequence, where each residual block includes two convolutional layers.

In conjunction with FIG. 2, multiple feature extractions are performed on an input image by the five convolutional layers (convolution operation is used to extract features, the max-pooling operation is used to reduce an image size, and an activation function is used to increase the nonlinearity of the network). Next, after a data stream passes through the nine residual blocks and the five deconvolutional layers, a resolution of the image is restored to the size of the input image, and then an output image is converted. For example, the size of a convolution kernel used by the entire network is 3×3, and the number of filters used in an encoding section is 64, 128, 256, 512, and 512 respectively.

The discriminator network employs, for example, a fully-connected neural network (FCN) to determine whether the input image comes from the output of the generator or from a reference image. In the embodiment of the present disclosure, the discriminator network does not employ a classification probability, but employs a special feature-based distance to measure the difference between the output image of the generator and the reference image. Specifically, instead of using the activation function based on real or fake classification, the discriminator directly uses two fully-connected layers to receive and output advanced features, and then calculates a distance between a real image and the reference image on this basis. The distance is used to compare a distribution similarity between the output image from the generator and the reference image, and can provide meaningful gradient information.

For the first generative adversarial network, a feature extraction is performed by using a trained non-attenuation-corrected PET image as an input of the generator to obtain a composite attenuation-corrected PET image, and the composite attenuation-corrected PET image is used as an input of the discriminator, and a trained attenuation-corrected PET image is used as the reference image of the discriminator.

For the second generative adversarial network, a feature extraction is performed by using a trained attenuation-corrected PET image as an input of the generator to obtain a composite CT image, and the composite CT image is used as an input of the discriminator, and a trained CT image is used as the reference image of the discriminator.

It is to be noted that the first generative adversarial network and the second generative adversarial network may be constructed into the same or different network structures. For example, the generator networks of the two generative adversarial networks may be designed to have different number of convolutional layers or different number of residual blocks, etc. For another example, the discriminators of the two generative adversarial networks may use different classification methods. A person skilled in the art may make appropriate modifications to the network model according to factors such as requirements for a processing speed and a processing accuracy, which is not limited by the present disclosure.

In Step S120, a loss function is designed for the generative adversarial network.

The Wasserstein Generative Adversarial Network is employed in the embodiment of the present disclosure, and the adversarial loss of the network may be defined as:

$$\min_G \max_D L_{WGAN}(G, D) = \qquad (1)$$
$$-E_x[D(x)] + E_z[D(G(x))] + \lambda E_{\hat{x}}\left[(\|\nabla_{\hat{x}} D(\hat{x})\|^2 - 1)^2\right]$$

wherein $\lambda$ represents a hyperparameter, which may be set as 10 based on experiences, X represents the input image, G(x) represents the output of the generator, E(·) is used for calculating an Earth-Mover (EM) distance, $\hat{x}$ represents a sample randomly selected from a real image and the reference image in a certain proportion, and D(·) represents a discrimination process of the discriminator.

In another embodiment, to make up for the traditional problem of image blur caused by a distance $L_2$, the multi-scale content loss, the image gradient loss and the structural similarity loss are introduced. For example, a total objective function is defined as follows:

$$L(I_{AC}, I_{sAC}) = \lambda_o \cdot \min_G \max_D L_{WGAN}(G, D) + \lambda_{mse} \cdot L_{mse}(I_{AC}, I_{sAC}) + \qquad (2)$$
$$\lambda_{gdl} \cdot L_{gdl}(I_{AC}, I_{sAC}) + \lambda_{content} \cdot L_{content}(I_{AC}, I_{sAC}) +$$
$$\lambda_{ssim} \cdot L_{ssim}(I_{AC}, I_{sAC})$$

wherein $I_{AC}$ represents a real attenuation-corrected PET image, $I_{sAC}$ represents a generated attenuation-corrected PET image, represents a weight of the adversarial loss, $\lambda_{mse}$ represents a weight of the mean square error, $\lambda_{gdl}$ represents a weight of the image gradient loss, $\lambda_{content}$ represents a weight of the multiscale content loss, and $\lambda_{ssim}$ represents a weight of the structural similarity loss. These hyperparameters may be set as appropriate values according to a plurality of experiment effects.

In the training process, an optimal solution is obtained by minimizing the total objective function, that is, a high-quality output image is obtained.

It is to be noted that those skilled in the art may change the above objective function according to an actual application. For example, in addition to the adversarial loss, one or more of the mean square error loss term, the image gradient loss term, the multiscale content loss tei and the structural similarity loss term may be selected, without having to include all of the above loss items.

In Step S130, the generative adversarial network is trained to obtain a mapping relationship between the non-attenuation-corrected PET image and the attenuation-corrected PET image and a mapping relationship between the attenuation-corrected PET image and the CT image.

For example, the generator and the discriminator are separately trained by extracting, from a data set of the non-attenuation-corrected PET image, the attenuation-corrected PET image and the CT image, a batch of paired image pairs as network input. Through training, the mapping relationships $G_1$ and $G_2$ between the input image and the reference image are obtained, wherein $G_1$ represents the mapping from the non-attenuation-corrected PET image to the attenuation-corrected PET image, and $G_2$ represents the mapping from the attenuation-corrected PET image to the CT image.

In the process of jointly training the generator and the discriminator of the generative adversarial network, an optimizer in the prior art may be used for optimization. For example, an Adam optimization algorithm is used for optimization, and an exponentially decreasing learning rate is used.

This method of network optimization using deep learning in combination with a plurality of loss functions can implement self-attenuation-correction of the non-attenuation-corrected PET image and achieve good results.

In Step S140, the composite PET/CT image is generated based on the obtained mapping relationships.

After the mapping relationships $G_1$ and $G_2$ are obtained, the composite PET/CT image may be directly generated based on the existing non-attenuation-corrected PET image. That is, the composite attenuation-corrected PET image is obtained by inputting the non-attenuation-corrected PET image to a trained model $G_1$, and then the composite CT image (still referring to FIG. 2) is obtained by inputting the composite attenuation-corrected PET image to a trained model $G_2$.

Correspondingly, the present disclosure provides a system for generating a composite PET-CT image based on a non-attenuation-corrected PET image, which is configured to implement one or more aspects of the above method. For example, the system includes: a network model constructing unit, configured to construct a first generative adversarial network containing a first generator and a first discriminator, and construct a second generative adversarial network containing a second generator and a second discriminator; a first training unit, configured to perform a feature extraction by using the non-attenuation-corrected PET image as an input of the first generator to obtain a composite attenuation-corrected PET image, and carry out a training by using the composite attenuation-corrected PET image as an input of the first discriminator and by using the attenuation-corrected PET image as a reference image of the first discriminator to obtain a mapping relationship $G_1$ between the non-attenuation-corrected PET image and the attenuation-corrected PET image; a second training unit, configured to perform a feature extraction by using the attenuation-corrected PET image as an input of the second generator to obtain a composite CT image, and carry out a training by using the composite CT image as an input of the second discriminator and by using the trained CT image as a reference image of the second discriminator to obtain a mapping relationship $G_2$ between the attenuation-corrected PET image and the CT image; and an image compositing unit, configured to generate the composite PET/CT image from the non-attenuation-corrected PET image by utilizing the mapping relationship and the mapping relationship $G_2$. In the system provided by the present disclosure, each module may be implemented by using a processor or a logic circuit.

It is to be noted that the present disclosure not only is applicable to replacing the existing PET/CT system, but also is applicable to a PET/MRI system after appropriate modification.

In summary, according to the present disclosure, two sets of networks are separately trained using an improved deep Wasserstein Generative Adversarial Network (a coupled residual network) to learn an end-to-end non-linear mapping relationship between the non-attenuation-corrected PET image and the attenuation-corrected PET image, and the attenuation-corrected PET image and the CT image. By combining various loss functions (such as the image gradient loss, the content loss and so on) to limit the output, the distortion of images generated by the generative adversarial network is effectively reduced, and the detailed information (such as edges, etc.) of the image is largely retained, thereby activating the network to generate high-quality images. The present disclosure implements the self-attenuation-correction of the PET image, and the generated CT image can provide more accurate anatomical location for the diagnosed PET imaging.

Figure 3:
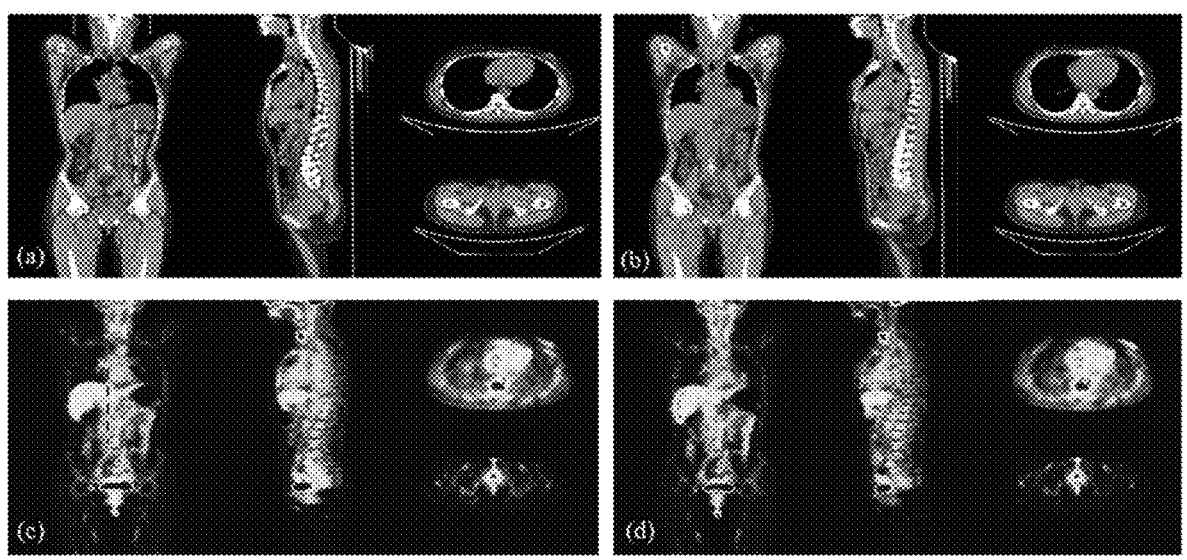
FIG. 3 is a diagram showing an experiment effect according to an embodiment of the present disclosure.

It has been verified that a clearer high-quality image can be obtained by using the present disclosure, referring to the comparison of experimental results on different slices as shown in FIG. 3, wherein (a) shows a reference CT image, (b) shows a composite CT image, (c) shows a reference PET image, and (d) shows a composite PET image.

The present disclosure may be a system, a method, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical fiber transmission, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer program instructions for carrying out operations of the present disclosure may be assembler instructions, instruction-set-architecture (ISA) instructions, machine instructions, machine dependent instructions, microcode, finnware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In a scenario involved with the remote computer, the remote computer may be coupled to the user's computer through any type of network, including a local area network (LAN) or a wide area network (WAN), or may be coupled to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described with reference to flowcharts and/or block diagrams according to the method, apparatus (system) and a computer program product of the embodiments of the present disclosure. It is to be understood that each block of the flowcharts and/or block diagrams, and combinations of blocks in the flowcharts and/or block diagrams, can be implemented by the computer readable program instructions.

These computer readable program instructions may be provided to a processor of a general purpose computer, special purpose computer, or other programmable data processing apparatus to produce a machine, such that these instructions, which execute via the processor of the computer or other programmable data processing apparatus, create means for implementing the functions/acts specified in one or more blocks in the flowcharts and/or block diagrams. These computer readable program instructions may also be stored in a computer readable storage medium that can direct a computer, a programmable data processing apparatus, and/or other devices to function in a particular manner, such that the computer readable medium having instructions stored therein includes an article of manufacture including instructions which implement aspects of the function/act specified in one or more blocks in the flowcharts and/or block diagrams.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in one or more blocks in the flowcharts and/or block diagrams.

The flowcharts and block diagrams in the accompanying drawings illustrate architectures, functions and operations of possible implementations of systems, methods, and computer program products according to a plurality of embodiments of the present disclosure. In this regard, each block in the flowcharts or block diagrams may represent a module, a program segment, or a portion of instructions, which includes one or more executable instructions for functions denoted by the blocks may occur in a sequence different from the sequences shown in the accompanying drawings. For example, two blocks shown in succession may, in fact, be executed substantially concurrently, or the blocks may sometimes be executed in a reverse sequence, depending upon the functions involved. It is also to be noted that each block in the block diagrams and/or flowcharts and/or a combination of the blocks in the block diagrams and/or flowcharts may be implemented by a special-purpose hardware-based system executing specific functions or acts, or by a combination of a special-purpose hardware and computer instructions. It is well known to those skilled in the art that implementations by means of hardware, implementations by means of software and implementations by means of software in combination with hardware are equivalent.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best explain the principles of the embodiments, the practical application or technical improvement over technologies found in the marketplace, or to enable others of ordinary skill in the art to understand the embodiments disclosed herein. The scope of the present disclosure is limited by the appended claims.

What is claimed is:

1. A method for generating a composite PET-CT image based on a non-attenuation-corrected PET image, comprising steps of:

constructing a first generative adversarial network containing a first generator and a first discriminator, and constructing a second generative adversarial network containing a second generator and a second discriminator;

performing a feature extraction by using the non-attenuation-corrected PET image as an input of the first generator to obtain a composite attenuation-corrected PET image, and carrying out a training by using the composite attenuation-corrected PET image as an input of the first discriminator and by using the attenuation-corrected PET image as a reference image of the first discriminator to obtain a mapping relationship $G_1$ between the non-attenuation-corrected PET image and the attenuation-corrected PET image;

performing a feature extraction by using the attenuation-corrected PET image as an input of the second generator to obtain a composite CT image, and carrying out a training by using the composite CT image as an input of the second discriminator and by using the trained CT image as a reference image of the second discriminator to obtain a mapping relationship $G_2$ between the attenuation-corrected PET image and the CT image; and generating a composite PET/CT image from the non-attenuation-corrected PET image by utilizing the mapping relationship $G_1$ and the mapping relationship $G_2$, wherein the first generative adversarial network and the second generative adversarial network are based on Wasserstein Generative Adversarial Network, and an adversarial loss is defined as:

$$\min_G \max_D L_{WGAN}(G, D) = -E_x[D(x)] + E_z[D(G(x))] + \lambda E_{\hat{x}}\left[\left(\|\nabla_{\hat{x}} D(\hat{x})\| ^2 - 1\right)^2\right]$$

wherein $\lambda$ represents a hyperparameter, X represents an input image, G(x) represents an output of the generator, E(·) is used for calculating an EM distance, $\hat{X}$ represents a sample randomly selected from a real image and the reference image, and D(·) represents a discrimination process of the discriminator.

2. The method for generating the composite PET-CT image based on the non-attenuation-corrected PET image according to claim 1, wherein the first generative adversarial network and the second generative adversarial network have the same or different network structures.

3. The method for generating the composite PET-CT image based on the non-attenuation-corrected PET image according to claim 1, wherein the first generator and the second generator have the same network structure, successively comprising a plurality of convolutional layers and pooling layers, a plurality of residual blocks, and a plurality of deconvolutional layers corresponding to the plurality of convolutional layers, and wherein the convolutional layer and the corresponding deconvolutional layer employ a hop connection.

4. The method for generating the composite PET-CT image based on the non-attenuation-corrected PET image according to claim 1, wherein the first discriminator and the second discriminator employ a fully-connected neural network to determine whether an input image comes from an output of a corresponding generator or from the reference image.

5. The method for generating the composite PET-CT image based on the non-attenuation-corrected PET image according to claim 4, wherein the first discriminator and the second discriminator compare, based on a distance, a distribution similarity between an output image from the corresponding generator and the reference image.

6. The method for generating the composite PET-CT image based on the non-attenuation-corrected PET image according to claim 1, wherein in a training process, a total objective function is set as comprising one or more of an adversarial loss term and a mean square error loss term, an image gradient loss term, a multiscale content loss term, and a structural similarity loss term.

7. The method for generating the composite PET-CT image based on the non-attenuation-corrected PET image according to claim 6, wherein in the training process, the total objective function is set as:

$$L(I_{AC}, I_{sAC}) = \lambda_o \cdot \min_G \max_D L_{WGAN}(G, D) + \lambda_{mse} \cdot L_{mse}(I_{AC}, I_{sAC}) +$$
$$\lambda_{gdl} \cdot L_{gdl}(I_{AC}, I_{sAC}) + \lambda_{content} \cdot L_{content}(I_{AC}, I_{sAC}) +$$
$$\lambda_{ssim} \cdot L_{ssim}(I_{AC}, I_{sAC})$$

wherein $I_{AC}$ represents a real attenuation-corrected PET image, $I_{sAC}$ represents a generated attenuation-corrected PET image, $\lambda_o$ represents a weight of the adversarial loss, $\lambda_{mse}$ represents a weight of the mean square error, $\lambda_{gdl}$ represents a weight of the image gradient loss, $\lambda_{content}$ represents a weight of the multiscale content loss, and $\lambda_{ssim}$ represents a weight of the structural similarity loss.

8. A system for generating a composite PET-CT image based on a non-attenuation-corrected PET image, comprising:
 a network model constructing unit, configured to construct a first generative adversarial network containing a first generator and a first discriminator, and construct a second generative adversarial network containing a second generator and a second discriminator;
 a first training unit, configured to perform a feature extraction by using the non-attenuation-corrected PET image as an input of the first generator to obtain a composite attenuation-corrected PET image, and carry out a training by using the composite attenuation-corrected PET image as an input of the first discriminator and by using the attenuation-corrected PET image as a reference image of the first discriminator to obtain a mapping relationship $G_1$ between the non-attenuation-corrected PET image and the attenuation-corrected PET image;
 a second training unit, configured to perform a feature extraction by using the attenuation-corrected PET image as an input of the second generator to obtain a composite CT image, and carry out a training by using the composite CT image as an input of the second discriminator and by using the trained CT image as a reference image of the second discriminator to obtain a mapping relationship $G_2$ between the attenuation-corrected PET image and the CT image; and
 an image compositing unit, configured to generate the composite PET/CT image from the non-attenuation-corrected PET image by utilizing the mapping relationship $G_1$ and the mapping relationship $G_2$, wherein the first generative adversarial network and the second generative adversarial network are based on Wasserstein Generative Adversarial Network, and an adversarial loss is defined as:

$$\min_G \max_D L_{WGAN}(G, D) = -E_x[D(x)] + E_z[D(G(x))] + \lambda E_{\hat{x}}\left[\left(\|\nabla_{\hat{x}} D(\hat{x})\|^2 - 1\right)^2\right]$$

wherein $\lambda$ represents a hyperparameter, X represents an input image, G(x) represents an output of the generator, E(·) is used for calculating an EM distance, $\hat{X}$ represents a sample randomly selected from a real image and the reference image, and D(·) represents a discrimination process of the discriminator.

9. A computer readable storage medium, storing a computer program, wherein when being executed by a processor, the program implements steps of the method according to claim 1.

* * * * *